United States Patent
Le Neel

(10) Patent No.: US 10,724,852 B2
(45) Date of Patent: Jul. 28, 2020

(54) DEVICE FOR THE CONTACTLESS THREE-DIMENSIONAL INSPECTION OF A MECHANICAL COMPONENT WITH TOOTHING

(71) Applicant: MESURE-SYSTEMS3D, Bruz (FR)

(72) Inventor: Didier Le Neel, Vern sur Seiche (FR)

(73) Assignee: Mesure-Systems3D SAS, Bruz (FR)

(*) Notice: Subject to any disclaimer, the term of this patent is extended or adjusted under 35 U.S.C. 154(b) by 0 days.

(21) Appl. No.: 15/969,314

(22) Filed: May 2, 2018

(65) Prior Publication Data

US 2018/0252517 A1    Sep. 6, 2018

Related U.S. Application Data

(63) Continuation-in-part of application No. PCT/EP2016/076337, filed on Nov. 2, 2016.

(30) Foreign Application Priority Data

Nov. 2, 2015 (FR) .................................. 15 60485

(51) Int. Cl.
    *G01B 11/06*      (2006.01)
    *G01B 11/24*      (2006.01)
    (Continued)

(52) U.S. Cl.
    CPC ........ *G01B 11/2416* (2013.01); *G01B 11/024* (2013.01); *G01B 11/06* (2013.01); *G01B 11/245* (2013.01); *G01B 2210/44* (2013.01)

(58) Field of Classification Search
    CPC .... G02B 6/0045; G02B 6/0048; G02B 23/14; G01J 2005/0077; G01J 5/10; G01J 3/024;
    (Continued)

(56) References Cited

U.S. PATENT DOCUMENTS 4,547,674 A * 10/1985 Pryor ..................... G01S 17/48
                                                     250/559.23
5,570,186 A    10/1996 Satzger et al.
              (Continued)

FOREIGN PATENT DOCUMENTS

| CN | 101458072 A | 6/2009 |
|---|---|---|
| CN | 104567679 A | 4/2015 |

(Continued)

OTHER PUBLICATIONS

Office Action dated Nov. 29, 2018 from the United States Patent and Trademark Office for corresponding U.S. Appl. No. 15/969,320, filed May 2, 2018.

(Continued)

*Primary Examiner* — Michael P Stafira
(74) *Attorney, Agent, or Firm* — Berkeley Law & Technology Group, LLP

(57) ABSTRACT

An inspection device for contactless three-dimensional inspection of a circular, mechanical component with toothing having a main axis of rotation. The device is configured to scan the teeth by at least one first pair of laser measurement modules and rotationally drive the component about the main axis relative to the laser measurement modules. The device then rebuilds a virtual three-dimensional representation of the component using data coming from said scanning and performs a dimensional inspection using the three-dimensional representation. Each pair of modules includes a first module oriented towards a first face of a tooth and a second module oriented towards a second face of a tooth. The modules are oriented relative to the component so that during a rotation of the component, the laser measurement modules scan the first and second faces of each tooth throughout their thickness and depth.

11 Claims, 6 Drawing Sheets

(51) Int. Cl.
*G01B 11/245* (2006.01)
*G01B 11/02* (2006.01)

(58) Field of Classification Search
CPC .......... G01J 3/0286; G01J 3/0291; G01J 3/10; G01J 5/0003; G01J 5/0007; G01J 5/0821; G01J 5/60; G01B 11/005; G01B 11/007; G01B 11/2416; G01B 11/26; G01B 2003/1023; G01B 2003/1069; G01B 2003/1087; G01B 2003/1092; G01B 2003/1094; G01B 3/10; G01B 3/1041; G01B 3/1084; G01B 3/12
See application file for complete search history.

(56) References Cited

U.S. PATENT DOCUMENTS

| | | |
|---|---|---|
| 2004/0083024 A1 | 5/2004 | Wang |
| 2012/0266680 A1 | 10/2012 | Boyer et al. |
| 2013/0335549 A1 | 12/2013 | Hatcher, Jr. et al. |
| 2014/0030092 A1 | 1/2014 | Heinig et al. |
| 2014/0232857 A1 | 8/2014 | Jahnke et al. |
| 2015/0047168 A1 | 2/2015 | James et al. |
| 2015/0193919 A1* | 7/2015 | Nissen .................... G06T 7/001 348/92 |
| 2015/0241391 A1* | 8/2015 | Makino .................... C21D 7/06 324/240 |
| 2018/0128596 A1* | 5/2018 | Mies .................... G01B 11/005 |

FOREIGN PATENT DOCUMENTS

| | | |
|---|---|---|
| DE | 4142676 A1 | 7/1993 |
| DE | 102010021421 A1 | 11/2011 |
| JP | 2014202534 A | 10/2014 |
| WO | 2016166035 A1 | 10/2016 |

OTHER PUBLICATIONS

International Search Report dated Jan. 18, 2017 for corresponding International Application No. PCT/EP2016/076337, filed Nov. 2, 2016.
Witten Opinion of the International Searching Authority dated Jan. 18, 2017 for corresponding International Application No. PCT/EP2016/076337, filed Nov. 2, 2016.
International Search Report dated Jan. 18, 2017 for corresponding International Application No. PCT/EP2016/076336, filed Nov. 2, 2016.
English translation of the Written Opinion of the International Searching Authority dated Jan. 18, 2017 for corresponding International Application No. PCT/EP2016/076336, filed Nov. 2, 2016.

* cited by examiner

DEVICE FOR THE CONTACTLESS THREE-DIMENSIONAL INSPECTION OF A MECHANICAL COMPONENT WITH TOOTHING

1. CROSS-REFERENCE TO RELATED APPLICATIONS

This Application is a Continuation-in-Part Application of International Application No. PCT/EP2016/076337, filed Nov. 2, 2016, the content of which is incorporated herein by reference in its entirety, and published as WO 2017/076854 on May 11, 2017, not in English.

2. FIELD OF THE INVENTION

The field of the invention is that of the dimensional measurement of mechanical components with toothing.

The invention relates more particularly to a device for the contactless, three-dimensional inspection of a mechanical component with toothing (i.e. with a set of teeth) such as a toothed wheel, a toothed pinion gear or a toothed shaft for example.

Here below in the description, the term "mechanical component with toothing" is used to cover all elements and components that could form part of a gearing or of a gearing system, a pinion-gear transmission, a rack-and-gear transmission or the like. The term "gear-toothing" is understood to mean the toothed part of the mechanical component concerned.

3. TECHNOLOGICAL BACKGROUND

Mechanical components with toothing that generally form a gearing system are widely used in mechanics to transmit motion, for example in the aeronautical, automotive and clock-making sectors. These mechanical components must be made with high precision in their dimensions or shape and they should be of constant and suitable quality.

It is therefore necessary to provide for dimensional inspection or controls for each of these components in order to ascertain that they are in truly compliance with the requisite manufacturing tolerance values. Such inspection is generally performed on the production line and involves a certain number of dimensional characteristics, namely: the shape and/or dimension of the toothing systems, the pitch of each toothing, the orientation of the toothing systems relative to the main axis of the component etc.

A classic solution consists in inspecting these components when they come off the production line either manually or by using automated dimensional inspection machines such as mechanical sensing machines. These sensing machines are used to acquire the dimensions and the shape of a component and then to check it.

However, the visual inspection of the components responds neither to high production rates nor to quality requirements in certain industrial fields, especially the aeronautical and automotive sectors where certain defects remain difficult to identify with the naked eye.

Mechanical sensing solutions also require a discontinuous inspection process that needs relatively lengthy inspection time. In addition, components with toothing generally have a complex shape (the toothing elements may have a particular shape and inclination relative to the axis of the particular component for example) requiring the use of separate machines to enable the inspection of all the dimensional characteristics of these components, and this is not an optimal method. In addition, present-day contactless inspection systems cannot be used to achieve the precision and rates (speeds) dictated by the manufacturing sector.

It is therefore desirable to propose an automatic inspection machine capable of carrying out precise, reproducible and high-speed checks on all the dimensional characteristics of mechanical components with toothing.

4. SUMMARY OF THE INVENTION

One particular embodiment of the invention proposes a device for the contactless three-dimensional inspection of a circular, mechanical component with toothing having a main axis of rotation, the teeth of said toothing having a defined thickness and a defined depth, each tooth having a first face and a second face. The device is such that it comprises:
  means for scanning each of said teeth, said means for scanning comprising at least one first pair of laser measurement modules and means for the rotational driving, about the main axis, of said component relative to the laser measurement modules, or vice versa;
  means for building a virtual three-dimensional representation of said component using data coming from said scanning means;
  means of dimensional inspection using said rebuilt three-dimensional virtual representation;
  each pair of laser measurement modules comprising a first module oriented towards a first face of a tooth and a second module oriented towards a second face of a tooth;
said laser measurement modules being oriented relative to said component so that during a rotation of said modules or of said component about the main axis, said scanning means scan said first and second faces of each tooth throughout their thickness and depth.

Thus, through an ingenious arrangement of at least one pair of laser measurement modules, the three-dimensional inspection device according to the invention can be used to carry out a complete and precise, automatic and contactless scan of the toothing of the mechanical component to be checked. An inspection of the totality of the dimensional characteristics of the component can then be carried out using measurement points derived from the scanning means.

Unlike existing solutions, the device according to the invention can be used to determine a cloud of measurement points for the component in three dimensions, within a few seconds and throughout its surface. Depending on the laser technology embedded in the measuring modules and on the associated method of inspection and of building the three-dimensional representation, it is possible to carry out an inspection of the component at very high speeds (within approximately one to five seconds).

According to one particular characteristic, each laser measurement module comprises a source of emission of a laser beam oriented relative to the main axis of rotation and relative to a radial axis of said component, and a laser beam receiver oriented to pick up the laser beam coming from said component.

One of the conditions for the orientation of the modules is that the axis of orientation of the laser beam of the modules can be inclined relative to the radial axis and to the main axis of rotation but should not be orthogonal to the main axis of rotation.

According to one particular aspect of the invention, the laser beam is oriented relative to the main axis of rotation by a first angle ranging from 10 to 45 degrees and relative to the radial axis by a second angle ranging from 10 to 45 degrees.

According to one particular characteristic, said scanning means comprise means for driving the mechanical component in translation along the main axis relative to the laser measurement modules, or vice versa.

Thus, when a mechanical component, such as a toothed wheel, has a toothed system with a thickness such that the size of the laser beam of the scanning means enables only partial scanning of the thickness of the toothing, a motion of translation of the component relative to the measurement modules or vice versa along the main axis can be achieved to ensure a complete scan throughout the thickness of the toothing.

The device according to this configuration can provide for simultaneous or sequential motion rotationally and in translation of the component relative to the laser measurement modules or vice versa.

According to one particular configuration, said circular mechanical component with toothing being a shaft with toothing disposed along the main axis and comprising a plurality of toothings placed one after the other along the main axis of rotation, said scanning means are such that they include means for the driving in translation of the mechanical component along the main axis relative to the laser measurement modules, or vice versa.

The driving means enable a scan of said first and second faces of each tooth throughout their thickness and depth and for each toothing. This configuration enables the performance of the sequenced scanning of the different toothings present at different levels on the component (as is the case for shafts with multiple toothing sets for example).

This configuration further enables the scanning of the remaining parts of the component having to toothing, throughout their rim (during rotation) and throughout their height (during translation), especially to determine the position of the main rotation axis of the component.

According to one alternative, said circular mechanical component with toothing being a shaft with toothing disposed along the main axis and comprising a plurality of toothings placed one after the other along the main axis, said scanning means are such that they comprise at least one second pair of laser measurement modules, each placed at the level of each toothing of said plurality to enable a scanning of said first and second faces of each tooth throughout their thickness and depth and for each toothing.

This configuration enables a simultaneous scanning of all the toothings placed at different levels along the main axis of the component (as is the case for shafts with multiple toothings for example) thus reducing the time taken to check the component.

According to one particular aspect of the invention, said scanning means furthermore comprise at least one third pair of laser measurement modules oriented relative to said component so that, during the rotation of said modules or said component about the main axis and during the translation of said modules or of said component relative to the main axis, said scanning means furthermore scan said shaft throughout its rim and its height.

This enables the precise determining of the position of the main axis of rotation of the component.

According to another particular aspect of the invention, said circular mechanical component with toothing comprises a circular hole having the main axis of rotation of said component as its axis and said scanning means furthermore comprise at least one additional laser measurement module oriented relative to said component so that, during the rotation of said modules or of said component about the main axis, said scanning means scan the hole throughout its surface.

Thus, this enables an inspection of other essential parts of a mechanical component with toothing with the simple addition of a laser measurement module. It makes it possible especially to determine the exact position of the main axis of the component to be inspected. The hole can be a through-hole or a blind hole having a smooth or non-smooth surface with grooves or tapping for example.

According to one particular characteristic, the circular mechanical component with toothing belongs to the group comprising:
  component with straight toothing;
  component with helical toothing;
  component with herringbone toothing.
This list is not exhaustive.

According to one particularly advantageous aspect of the invention, the measuring modules are provided with a line-type laser emitting source.

The line laser can be used to obtain a scanning field sufficient to cover the entire depth of the teeth of the component.

5. LIST OF FIGURES

Other features and advantages of the invention shall appear from the following description given by way of an indicatory and non-exhaustive example and from the appended drawings of which:

Figure 5A:
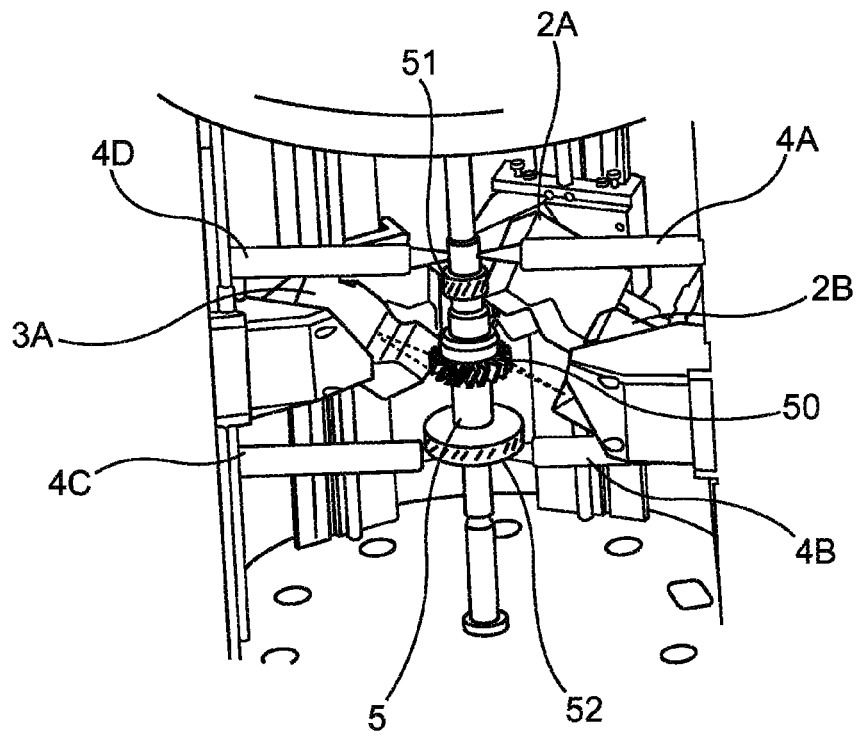
Figure 3:
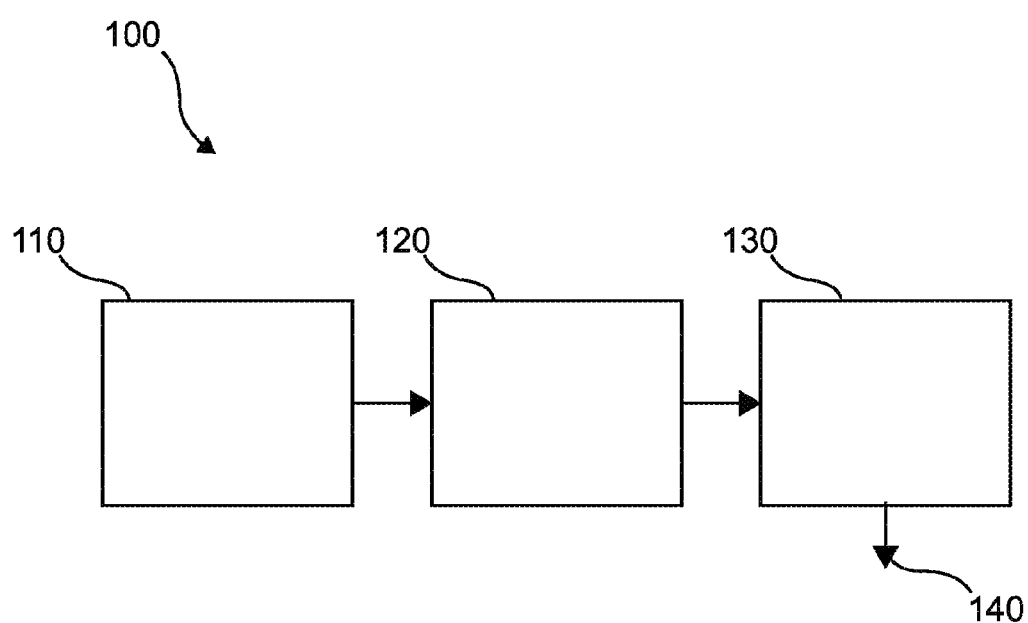
Figure 6:
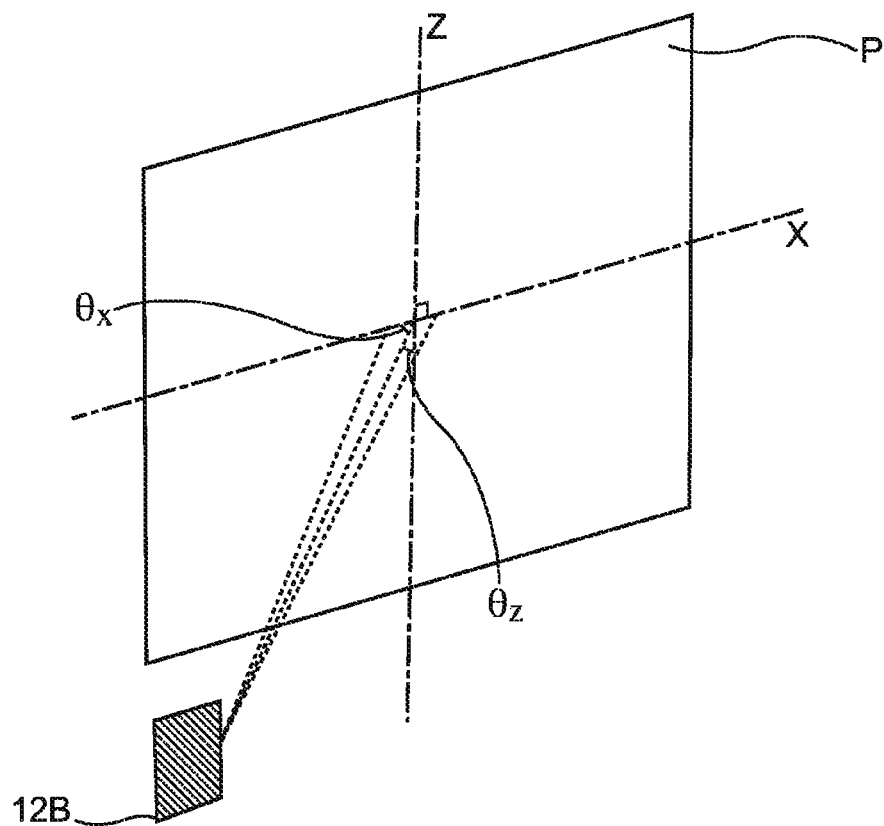
Figure 3A:
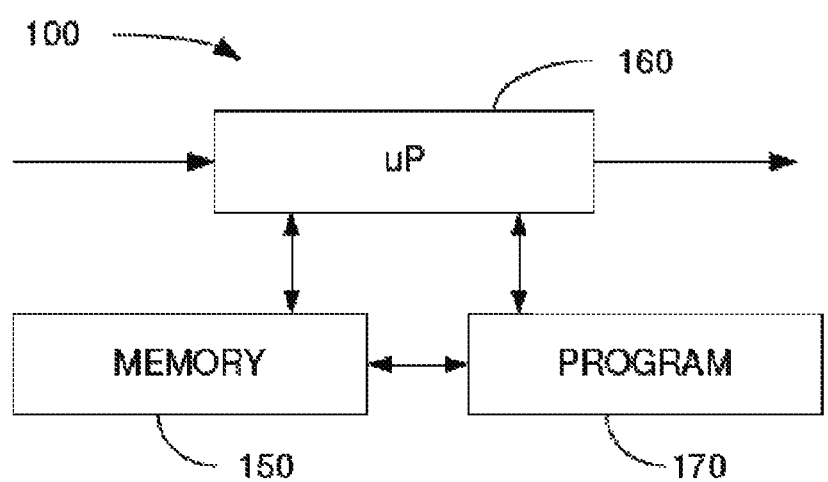
Figure 4:
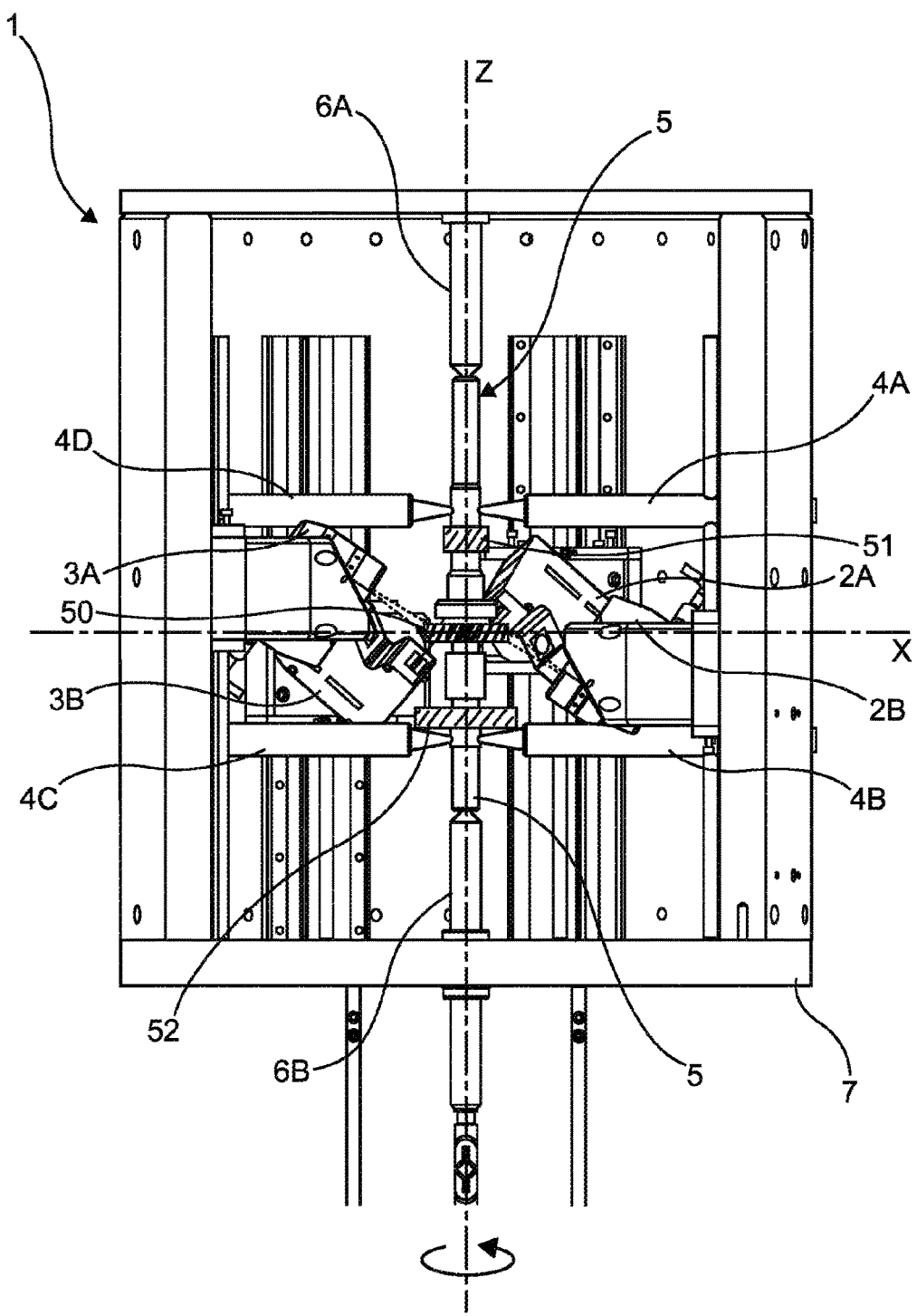
Figure 5B:
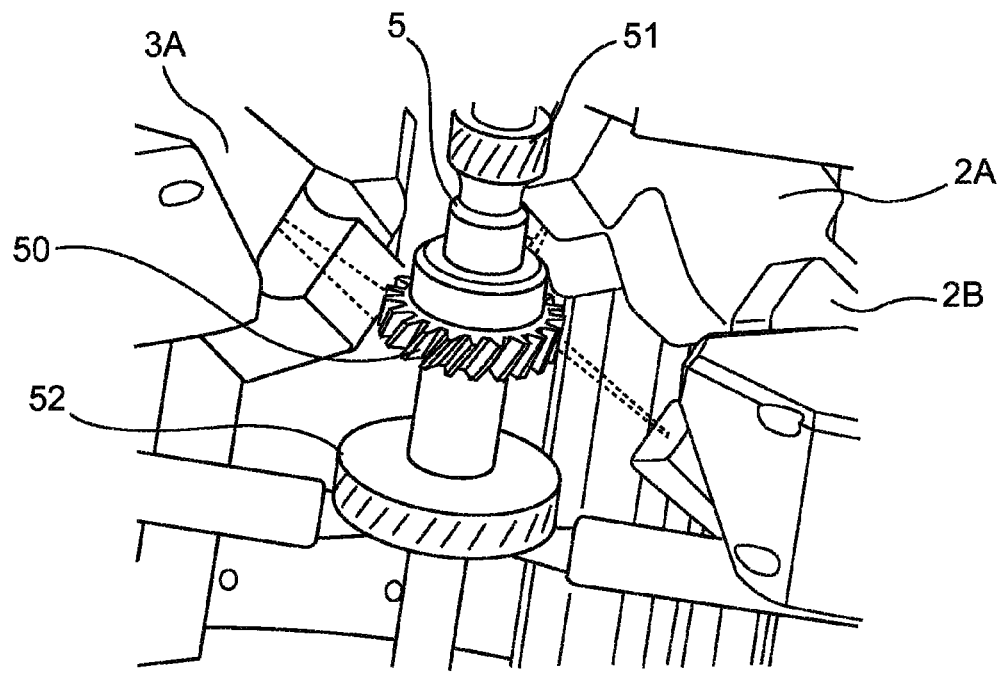
Figure 5C:
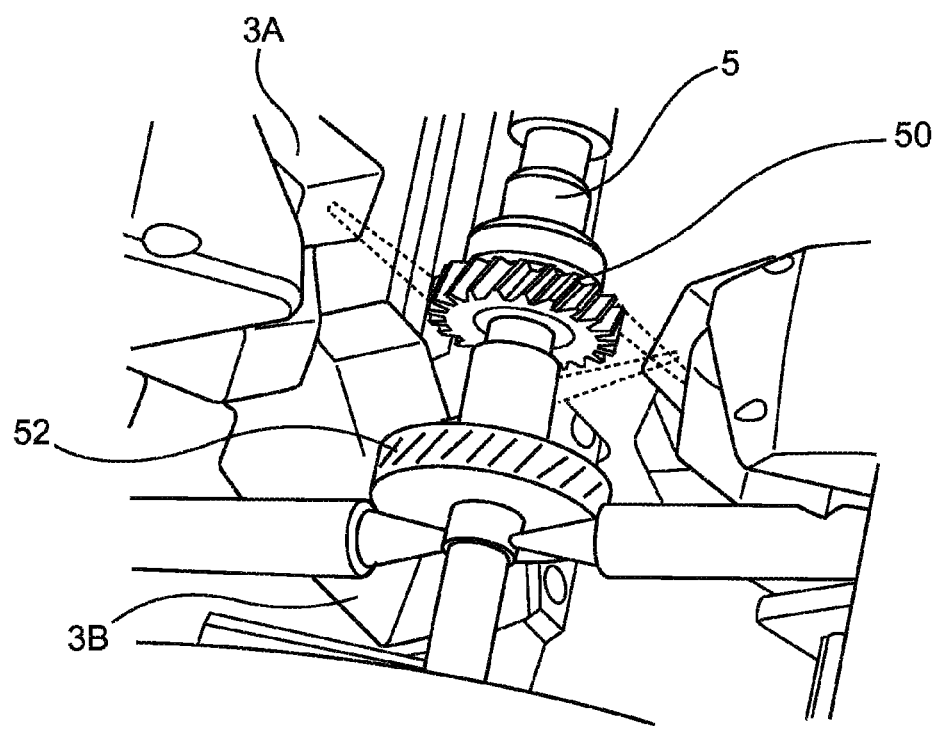

FIG. 3 presents the schematic structure of a three-dimensional inspection device in the form of schematic blocks according to one particular embodiment of the invention;

FIG. 3A illustrates an exemplary structure of the inspection device for a particular embodiment;

FIG. 4 is a view in perspective or three-quarter view of a three-dimensional inspection device performing a scan of the surface of a shaft with multiple toothings according to one particular embodiment of the invention;

FIGS. 5A-5C represent partial and detailed views of the inspection device illustrated in FIG. 4;

FIG. 6 is a drawing illustrating a particular orientation of a laser beam for a measurement module scanning a tooth face.

6. DETAILED DESCRIPTION

In all the figures of the present document, the identical elements and steps are designated by one and the same numerical reference.

Referring to FIGS. 1, 2A to 2D, we describe the structure and working of a contactless three-dimensional inspection device 10 according to one particular embodiment of the invention, adapted to the inspection of circular mechanical components with toothing taking the form of a toothed wheel (or pinion gear) 20.

Figure 1:
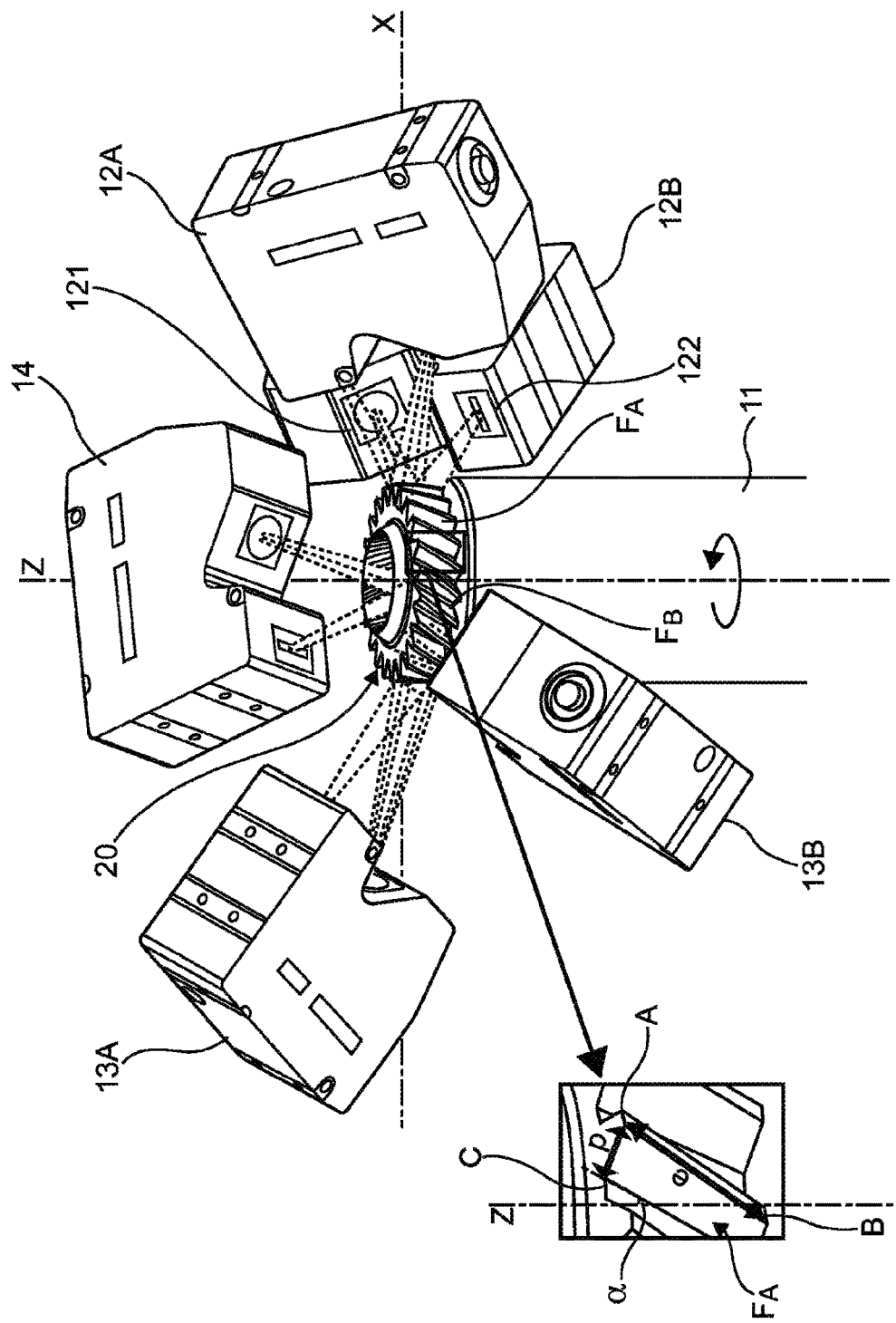
FIG. 1 is a view in perspective or three-quarter view of a set of measurement modules of a three-dimensional inspection device, according to one particular embodiment of the invention, performing a scan of the surface of a toothed wheel.
Figure 2A:
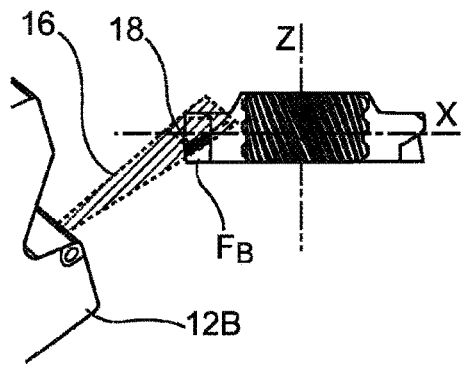
FIGS. 2A-2F are schematic views showing different phases of the process of laser scanning of the toothed wheel illustrated in the context of the embodiment of FIG. 1.
Figure 2D:
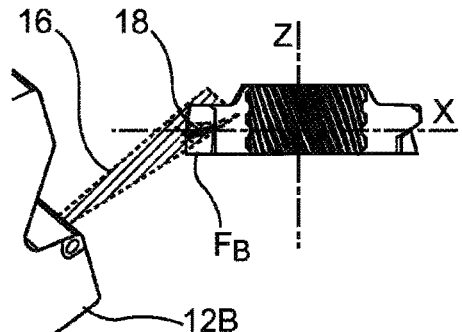
Figure 2B:
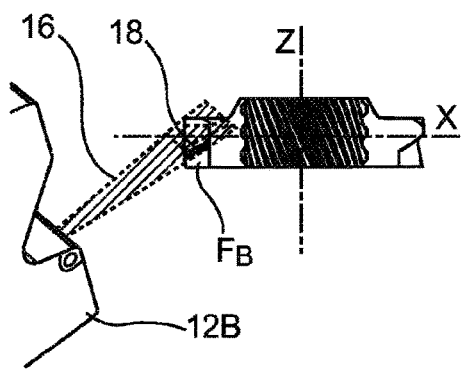
Figure 2E:
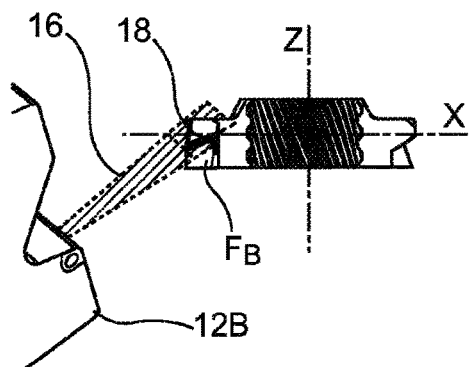
Figure 2C:
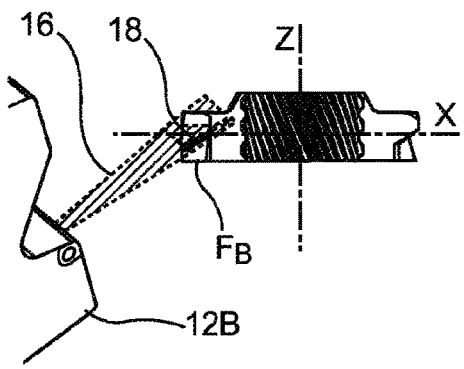
Figure 2F:
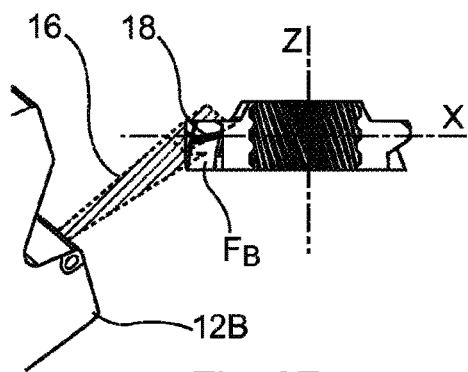

The inspection device 10 comprises, in the embodiment illustrated in FIG. 1, an object-holder 11 mounted rotationally mobile relative to a frame (not illustrated in the figure).

The object-holder 11 holds the toothed wheel 20 to be inspected within the device. The object-holder 11 cooperates with the system used to drive the object-holder in rotation, the unit forming means for the rotational driving of the toothed wheel according to the invention.

In general, a toothed wheel 20 has a main rotation axis Z and a radial axis X orthogonal to the axis Z. Each tooth of the toothed wheel 20 has a given thickness e along the main axis (corresponding to the segment AB) and a given depth p along the radial axis (corresponding to the segment AC). Each tooth also has two main faces $F_A$ and $F_B$. In this example, the thickness of the toothed wheel 20 is 2.5 cm and its depth is 1 cm for example.

The toothed wheel 20 is an annular component provided with an external toothing and a through hole passing along its main axis. This hole has an internal wall that is smooth or tapped for example.

In FIG. 1, the inspection device 10 according to the invention implements four laser measurement modules dedicated to the inspection of the toothing of the toothed wheel 20, namely: a first pair of laser measurement modules 12A-12B dedicated to a first surface measurement of the teeth of the toothed wheel 20 and a second pair of laser measurement module 13A-13B dedicated to a second surface measurement of the teeth of the toothed wheel 20. More particularly, each pair of laser measurement modules (12A-12B; 13A-13B) is constituted by first module (12A; 13A) oriented towards a first face $F_A$ of a tooth of the toothing and a second module oriented towards the second face of a second tooth of the toothing. Thus, the first modules 12A and 13A are disposed appreciably upwards relative to the toothed wheel 20 and the second modules 12B and 13B are disposed appreciably downwards relative to this toothed wheel 20.

For a given pair of measurement modules, the two measurement modules of a given pair are disposed so as to measure a same tooth of the toothing or two distinct teeth of the toothing as is the case in FIG. 1. Each laser measurement module of the two pairs of modules represented here is fixedly attached to a frame by means of a support (not shown) that can be configured or modulated according to the component to be inspected and its dimensional characteristics. This enables the orientation of each measurement module appropriately according to the face of the teeth with which it is associated and the dimensions of the toothed wheel 20.

In the example illustrated herein, the laser measurement modules, 12A, 12B, 13A and 13B are fixed and it is the object-holder 11 that is mobile in rotation about the main axis Z of the toothed wheel 20. Naturally, an alternative embodiment can be envisaged in which the object-holder 11 is fixed and it is the frame to which the modules are fixedly attached that is mobile in rotation about the main axis Z of the toothed wheel 20.

The set of laser measurement modules illustrated herein constitutes the laser scanning means of the device according to the invention. The laser scanning means are associated with means for processing measurements acquired by the scanning means (the principle of which is described further below with reference to FIG. 3) to rebuild the three-dimensional surface of the toothed wheel and carry out a dimensional inspection of this toothed wheel.

According to the invention, the laser measurement modules 12A, 12B, 13A and 13B are oriented relative to the toothed wheel 20 so that during a rotation of the toothed wheel 20 about its main axis Z, the scanning means scan the first and second main faces $F_A$ and $F_B$ of each tooth of the toothed wheel throughout their thickness e and depth p.

The FIGS. 2A to 2F represent different phases of the laser scanning process for scanning the toothed wheel 20 for a given laser measurement module, such as the module 12B for example. Only the laser beam emitted by the measurement module is illustrated here, for reasons of readability of the drawings.

The measurement module 12B is, in this example, a laser measurement module working according to the principle of laser triangulation. In a known way, such a measurement module is capable of measuring a distance by angular computation. It also covers a wide range of measurements and has high resolution. Known technologies other than laser triangulation can of course be used without departing from the framework of the invention. The measurement module 12B comprises a laser emission source 121, for example a laser diode that projects a plane laser beam 16 on one of the faces of the teeth to be scanned (here the main face $F_B$) and a laser receiver 122, for example a CCD (Charge-Coupled Device) type sensor or CMOS (Complementarity Metal-Oxide-Semiconductor) type sensor. The laser emission source and the corresponding laser receiver are situated on the same face of the measurement module, this face being oriented towards the toothed wheel 20.

The other measurement modules 12A, 13A and 13B are preferably identical. In general, to maximize the laser scanning quality, the measuring modules of each pair must be of identical technology.

When the object-holder 11 (and therefore the toothed wheel 20) is put into rotation, the laser beam emitted by the source is reflected on the face $F_B$ of the toothed wheel 20, for which it is desired to know the position or distance from the laser source (i.e. relative to the measurement module 12B). The laser receiver 122 is oriented to pick up the laser beam coming from the toothed wheel 20. The reflected laser beam reaches the receiver 122 at an angle that depends on the distance. The position of the laser beam reflected on the receiver 122 as well as the distance between the source and the receiver of the measurement module 12B can be used to deduce the information on distance for each measurement point acquired.

The intersection between the laser beam 16 and the face $F_B$ of the tooth forms a scanning laser line 18 that moves on the scanned face $F_B$ as and when the toothed wheel 20 rotates about its main axis, as illustrated in FIGS. 2A to 2F.

More particularly, according to the invention, the measurement module 12B is laid out so that the emission source 121 is oriented relative to the main axis of rotation Z on the one hand and relative to a radial axis X of the toothed wheel 20 on the other hand so that the laser line 18 covers the entire depth of the toothed system p (i.e. from head to foot of each tooth) and so that the laser line 18 scans the entire thickness e of the of the toothing as and when the toothed wheel 20 rotates.

In other words, the measurement module 12B is laid out relative to the toothed wheel 20 so that the laser line 18 cover the entire depth of the teeth, the scanning of the teeth on their thickness being obtained through the rotation of the toothed wheel 20.

One of the conditions relating to the orientation of the modules is that the axis of orientation of the laser beam of the modules can be inclined relative to the radial axis and the main rotation axis but should not be orthogonal with the main rotation axis.

FIG. 6 illustrates a particular example of orientation of the laser beam of the measurement module 12B relative to the face of one of the teeth being scanned. P denotes the plane containing main axis Z and the radial axis X. The measurement module 12B is oriented towards the second face $F_B$ so that the laser beam is inclined upwards relative to the radial axis X by an angle θx ranging from 10 to 45 degrees (for example 30 degrees) and by an angle θz relative to the main rotation axis Z ranging from 10 to 45 degrees (for example 20 degrees). The angles θx and θz depend especially on the angle of inclination α of the teeth of the toothing (or helix angle). The angle of inclination α usually varies from 15 to 30 degrees, for example, for pinion-gear type parts.

The same principle can be applied to the first module 12A of the pair of measurement modules 12A and 12B, the laser beam of said module 12A having to be inclined downwards relative to the radial axis X of the angle θx to face the corresponding tooth face $F_A$.

Finally, to carry out a scan of the toothed wheel 20 in its totality (and not only at the level of the toothing system of the component), the scanning means comprise a fifth laser measurement module 14 distinct from the two pairs of modules 12A-12B and 13A-13B, placed appreciably upwards relative to the toothed wheel 20 so as to enable a laser scan at the upper surface of the toothed wheel 20 and more specifically at the through hole. The measurements derived from this measurement module 14 make it possible especially to measure the main rotation axis of the toothed wheel 20 and to inspect the dimensions of the through hole. The working of the measurement module 14 is identical to the one described further above for the other measurement modules.

It must be noted that, should the toothed wheel to be inspected has a toothing with a thickness such that the size of the laser beam of the scanning means enable only a partial scanning of the thickness of the toothing during rotation, it can be planned that the scanning means are furthermore provided with means for the driving in translation of the toothed wheel 20 along the main axis Z relative to the laser measurement modules (or vice versa) to carry out a full scan of the entire thickness of the toothing. It is therefore possible making provision for a simultaneous or sequenced motion in rotation and translation motion of the component relative to the laser measurement modules (or vice versa).

The number of pairs of the measurement modules is not limited to the example illustrated here above. A greater number (i.e. a number greater than 2) or a smaller number (i.e. a number smaller than 2) could be envisaged without departing from the framework of the invention, especially depending on the complexity of the shape of the mechanical component, the number of measurement points desired and/or the processing time desired and/or other parameters that those skilled in the art will deem it appropriate to take into account.

FIG. 3 now presents the generic characteristics of the three-dimensional inspection device 100 in the form of functional blocks, according to one particular embodiment of the invention.

The inspection device 100 comprises scanning means 110 for scanning each of the teeth of the toothing of the component to be inspected. These scanning means are provided with laser measurement modules and driving means as described further above with reference to FIGS. 1, 2A to 2F.

The inspection device 100 comprises means 120 for building a virtual three-dimensional representation of the component using data (or measuring points) derived from the scanning means 110. To this end, the inspection device 100 implements a software program for processing clouds of points and for the virtual three-dimensional representation of the component to be inspected. The data coming from the modules take the form of clouds of points of co-ordinates defined in a three-dimensional space. The time needed to read the points is relatively short (between 1 to 30 million points, depending on the number of measurement modules, are acquired in a time span of one second to five seconds). In general, a single 360-degree rotation of the component (at the altitude where the component needs to be measured) is enough to acquire all the measuring points needed for the three-dimensional rebuilding and the dimensional inspection of the component.

The inspection device 100 comprises means of dimensional inspection of the component according to the virtual three-dimensional representation obtained by the building means 120. The inspection means 130 are configured to deliver 140 at least one quantity representing a dimension of the mechanical component or a piece of information accepting or rejecting the component subjected to inspection according to the result of the inspection made by the inspection means 130 (compliance or non-compliance with dictated dimensional and/or geometrical tolerance values, etc.).

Such an inspection device can easily be integrated into a production line.

FIG. 3A illustrates an exemplary structure of the inspection device 100 for a particular embodiment. The inspection device 100 includes at least one non-transitory computer-readable medium 150 and a processor unit 160, e.g. having a microprocessor μP, which is controlled by code instructions of a computer program 170, which is stored on medium 150. When executed by the processing unit 160, the code instructions configure the inspection device 100 to perform and control a contactless three-dimensional inspection as described herein, such as the functional blocks shown in FIG. 3.

Referring now to FIGS. 4, 5A to 5C, we present the structure and working of a contactless three-dimensional inspection device 1 adapted to inspecting circular mechanical parts with toothing systems taking the form of a shaft 5 with multiple toothing.

The inspection device 1 comprises two vertical arms 6A and 6B in the form of tips holding the shaft 5 with toothing at each of its extremities along its main rotation axis. The arm 6B cooperates with a dual rotation and translation drive system enabling the shaft 5 with toothing to be put into rotation and/or translation relative to the frame 7 that is fixed to it. The arm 6A cooperates with a simple system for driving in translation (guidance in translation of the shaft along its main axis). These elements form the means for driving the device according to the invention in rotation and in translation.

The shaft 5 with toothing herein has three toothings 50, 51 and 52 placed at different levels of the shaft along the main rotation axis Z. The radial axis of the toothing 50, for example is denoted X, and is orthogonal to Z. Each toothing system can be of a different type (helical toothing, straight toothing, herringbone toothing etc.) and can have different dimensions.

Here below in the description, we shall strive initially to describe the device for carrying out an inspection of the helical toothing 50 of the shaft 5.

The inspection device 1 according to the invention implements four laser measurement modules to inspect the toothing 50 of the shaft 5, namely: a first pair of laser measurement modules 2A-2B dedicated to a first measurement of the surface of the teeth of the toothing 50 and a second pair of laser measurement modules 3A-3B dedicated to a second surface measurement of the teeth of the toothing 50. More particularly, each pair of laser measurement modules (2A-2B; 3A-3B) is constituted by a first module (2A; 3A) oriented towards a first face $F_A$ of a tooth of the toothing and a second module oriented towards the second face of another tooth of the toothing, according to the same principle as the one developed further above with reference to the toothed wheel (FIG. 1, 2A to 2F). Thus, according to the invention, the laser measurement modules 2A, 2B, 3A and 3B are oriented relative to the toothing 50 so that, during a rotation of the shaft 5 about its main axis Z, the scanning means carry out a scanning of the first and second main faces $F_A$ and $F_B$ of each tooth of the toothing 50 throughout its thickness and depth.

In addition to the rotational driving means, means for driving the shaft 5 with toothing in translation are provided in the inspection device 1, to enable the guidance of the shaft along its main axis Z during or not during the rotation of the shaft 5 with toothing (a motion of the shaft in translation can be implemented simultaneously or not simultaneously with a motion in rotation). This makes it possible firstly to carry out a full scan throughout the thickness of a toothing when this toothing has a thickness such that the size of the laser beam of the measurement modules does not enable the entire thickness of the toothing to be covered. Secondly, the translational driving means can be activated to shift the component along the main axis to enable a scanning and an acquisition of the points of measurement of the other toothings 51 and 52 of the shaft (this has the effect of enabling a scanning of the first and second main faces of each tooth throughout its thickness and depth, and to achieve this for each toothing) and, as the case may be, the other parts of the component in order to carry out a complete inspection of the shaft 5 with toothing. It must be noted that to carry out a sequenced scanning of the toothings 50, 51 and 52 using the same pairs of measurement modules, the type of profile and the dimensions must be appreciably similar. This depends on the field of measurement of the measurement modules used in the inspection device (the field of measurement that can effectively vary by a few millimeters to a few centimeters depending on the technology of the measurement modules). As the case may be, the orientation of the laser measurement modules 2A, 2B, 3A, 3B should be adapted to the type of toothing with which the component is provided. A mechanical system of automatic orientation of the modules could be envisaged to adapt in real time to the shape and dimensions of the mechanical component to be inspected.

This configuration enables a sequenced scanning of the different parts of the shaft 5 including all the toothings.

As an alternative to this configuration, the scanning means can include at least one other pair of laser measurement modules (not illustrated in the figures) placed at the level of each toothing of the shaft to enable a scanning and an acquisition of the measurement points of the faces of each tooth of each toothing throughout their thickness and depth (the orientation of the modules is configurable in real time).

This configuration enables a simultaneous scanning of all the toothings placed at different levels along the main axis of the shaft 6 with toothing thus reducing the time of inspection of the component.

Thus, the device according to the invention enables an automatic, complete and contactless inspection of the component capable of having a complex shape, especially with several levels of toothings, themselves having different profiles of teeth, different sizes (depth, thickness, diameter etc.).

In addition, the scanning means can be configured to scan not only the toothings but also the surface of the remaining parts of the shaft 5 in order to make it possible to determine the position of the main axis of rotation of the component. In one alternative embodiment, this scanning operation is carried out by the additional measurement modules 4A, 4B, 4C, 4D disposed so as to be fixed relative to the frame 7 and perpendicular to the axis of the component. The surface of said remaining parts of the shaft 5 is checked by activating the means of rotational driving and the means of translational driving of the shaft 5 relative to the measurement modules so as to scan the surface of said remaining parts throughout their rim and throughout their height respectively.

An exemplary embodiment of the present disclosure overcomes the various drawbacks of these prior art techniques of dimensional measurement and inspection.

More specifically, an exemplary embodiment provides an inspection device that enables, contactless, high-speed, complete, automatic, three-dimensional inspection of a mechanical component with toothing.

Although the present disclosure has been described with reference to one or more examples, workers skilled in the art will recognize that changes may be made in form and detail without departing from the scope of the disclosure and/or the appended claims.

The invention claimed is:

1. A device for contactless three-dimensional inspection of a circular, mechanical component with toothing having a main axis of rotation, the teeth of said toothing having a defined thickness and a defined depth, each tooth having a first face and a second face, said device comprising:
   at least one first pair of laser measurement modules;
   a rotational drive, which drives, about the main axis, said component relative to the laser measurement modules, or vice versa;
   a data processor; and
   a non-transitory computer-readable medium comprising software instructions stored thereon, which when executed by the data processor configure the data processor to perform acts comprising:
      building a virtual three-dimensional representation of said component using data coming from said at least one first pair of laser measurement modules;
      dimensional inspection using said rebuilt virtual three-dimensional representation to produce an inspection result;
   each pair of laser measurement modules comprising a first module oriented towards the first face of a tooth and a second module oriented towards the second face of a tooth;
   said laser measurement modules being oriented relative to said component so that during rotation of said modules or of said component about the main axis, said laser measurement modules scan said first and second faces of each tooth throughout their thickness and depth.

2. The device according to claim 1, wherein each laser measurement module comprises a source of emission of a laser beam oriented relative to the main axis of rotation and relative to a radial axis of said component, and a laser beam receiver oriented to pick up the laser beam coming from said component.

3. The device according to claim 2, wherein the laser beam is oriented relative to the main axis of rotation by a first angle ranging from 10 to 45 degrees and relative to the radial axis by a second angle ranging from 10 to 45 degrees.

4. The device according to claim 1, further comprising a translational drive, which drives the mechanical component in translation along the main axis relative to the laser measurement modules, or vice versa.

5. The device according to claim 1, wherein, said circular mechanical component with toothing being a shaft with toothing disposed along the main axis and comprising a plurality of toothings placed one after the other along the main axis of rotation, device comprising a translational drive, which drives in translation the mechanical component along the main axis relative to the laser measurement modules, or vice versa.

6. The device according to claim 1, wherein said circular mechanical component with toothing is a shaft with toothing disposed along the main axis and comprising a plurality of toothings placed one after the other along the main axis, and wherein said device further comprises at least one second pair of laser measurement modules, each placed at the level of each toothing of said plurality to enable a scanning of said first and second faces of each tooth throughout their thickness and depth and for each toothing.

7. The device according to claim 6, wherein said device furthermore comprises at least one third pair of laser measurement modules oriented relative to said component so that, during the rotation of said first, second and third pair of modules or said component about the main axis and during the translation of said modules or of said component relative to the main axis, said third pair of measurement modules furthermore scan said shaft throughout its rim and its height.

8. The device according to claim 1, wherein said circular mechanical component with toothing is a toothed wheel comprising a circular hole having the main axis of rotation of said component as its axis and wherein said device furthermore comprises at least one additional laser measurement module oriented relative to said component so that, during the rotation of said first pair of modules and said additional module or of said component about the main axis, said additional laser measurement module scans the hole throughout its surface.

9. The device according to claim 1, wherein the circular mechanical component with toothing belongs to the group consisting of a component with straight toothing, a component with helical toothing, a component with herringbone toothing.

10. The device according to claim 1, wherein the measuring modules are provided with a line-type laser emitting source.

11. A device for contactless three-dimensional inspection of a circular, mechanical component with toothing having a main axis of rotation, the teeth of said toothing having a defined thickness and a defined depth, each tooth having a first face and a second face, said device comprising:
  means for scanning each of said teeth, said means for scanning comprising at least one first pair of laser measurement modules (12A, 12B) and means for rotationally driving, about the main axis, said component relative to the laser measurement modules, or vice versa;
  means for building a virtual three-dimensional representation of said component using data coming from said scanning means; and
  means for dimensionally inspecting using said rebuilt virtual three-dimensional representation to produce an inspection result;
  each pair of laser measurement modules comprising a first module oriented towards the first face of a tooth and a second module oriented towards the second face of a tooth;
  said laser measurement modules being oriented relative to said component so that during rotation of said modules or of said component about the main axis, said scanning means scan said first and second faces of each tooth throughout their thickness and depth.

* * * * *